US011994138B2

(12) United States Patent
Morita et al.

(10) Patent No.: US 11,994,138 B2
(45) Date of Patent: May 28, 2024

(54) GAS COMPRESSOR WITH A PLURALITY OF AIR REALEASE SYSTEMS EACH HAVING AN AIR RELEASE VALVE AND AN AIR REGULATING VALVE

(71) Applicant: HITACHI INDUSTRIAL EQUIPMENT SYSTEMS CO., LTD., Tokyo (JP)

(72) Inventors: Kenji Morita, Tokyo (JP); Masahiko Takano, Tokyo (JP); Masakazu Hase, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 204 days.

(21) Appl. No.: 17/601,937

(22) PCT Filed: Mar. 24, 2020

(86) PCT No.: PCT/JP2020/013114
§ 371 (c)(1),
(2) Date: Oct. 7, 2021

(87) PCT Pub. No.: WO2020/213353
PCT Pub. Date: Oct. 22, 2020

(65) Prior Publication Data
US 2022/0136513 A1     May 5, 2022

(30) Foreign Application Priority Data

Apr. 15, 2019    (JP) .................................. 2019-076771

(51) Int. Cl.
*F04D 25/06*     (2006.01)
*F04C 28/24*     (2006.01)
(Continued)

(52) U.S. Cl.
CPC .............. *F04D 25/06* (2013.01); *F04C 28/24* (2013.01); *F04D 17/10* (2013.01); *F04D 27/004* (2013.01);
(Continued)

(58) Field of Classification Search
CPC ...................................... F04D 27/003
See application file for complete search history.

(56) References Cited

U.S. PATENT DOCUMENTS 3,582,233 A * 6/1971 Bloom .................... F04C 28/24
                                                 417/279
4,406,589 A * 9/1983 Tsuchida ................ F04C 28/24
                                                 417/295
(Continued)

FOREIGN PATENT DOCUMENTS

| JP | 57-25191 U | | 2/1982 | |
| JP | 61-053581 | * | 4/1986 | .............. F04B 49/22 |

(Continued)

OTHER PUBLICATIONS

JP61053581 Machine Translation; Google Translate, Jul. 27, 2023. (Year: 1986).*
(Continued)

*Primary Examiner* — Nathan C Zollinger
*Assistant Examiner* — Timothy P Solak
(74) *Attorney, Agent, or Firm* — MATTINGLY & MALUR, PC (57) ABSTRACT

A gas compressor includes a compressor main body, an electric motor that supplies driving force to the compressor main body, a power conversion device, a plurality of air release valves disposed in a plurality of air release systems communicating with a discharge piping system to discharge the compressed gas to an atmospheric pressure environment, and a controller. The gas compressor performing an unload
(Continued)

──── : COMPRESSED AIR SYSTEM
---- : LUBRICANT SYSTEM
----- : CONTROL SYSTEM
---- : ELECTRIC SYSTEM operation of reducing, when a discharge pressure reaches a predetermined pressure, a load on the compressor main body by opening one of the air release valves. The gas compressor including the plurality air release systems for each of which the air release value is disposed, and a plurality of pressure regulating valves provided on a downstream side of each air release valve, respectively, wherein the controller selects one of the air release valves and performs the unload operation.

5 Claims, 8 Drawing Sheets (51) Int. Cl.
F04D 17/10 (2006.01)
F04D 27/00 (2006.01)
F04D 27/02 (2006.01)
F04B 49/06 (2006.01)

(52) U.S. Cl.
CPC ......... F04D 27/007 (2013.01); F04D 27/009 (2013.01); F04D 27/0253 (2013.01); F04B 49/06 (2013.01); F04D 27/003 (2013.01); F04D 27/0223 (2013.01)

(56) References Cited

U.S. PATENT DOCUMENTS

| | | | |
|---|---|---|---|
| 6,287,083 B1* | 9/2001 | Hase | F04B 49/025 417/2 |
| 6,461,112 B1 | 10/2002 | Ohta et al. | |
| 2011/0194928 A1* | 8/2011 | Lee | F04D 27/0207 415/144 |
| 2020/0011324 A1 | 1/2020 | Oshiro | |

FOREIGN PATENT DOCUMENTS

| | | |
|---|---|---|
| JP | 61-53581 U | 4/1986 |
| JP | 2001-342982 A | 12/2001 |
| JP | 2013-32728 A | 2/2013 |
| WO | 2017-130303 A1 | 8/2017 |
| WO | 2018-179789 A1 | 10/2018 |

OTHER PUBLICATIONS

Japanese Office Action received in corresponding Japanese Application No. 2021-514842 dated Dec. 13, 2022.
Translation of the International Preliminary Report on Patentability received in corresponding International Application No. PCT/JP2020/013114 dated Oct. 28, 2021.
International Search Report of PCT/JP2020/013114 dated Jun. 16, 2020.

* cited by examiner

FIG. 1

CONVENTIONAL EXAMPLE

——— : COMPRESSED AIR SYSTEM
– – – : LUBRICANT SYSTEM
—·—· : CONTROL SYSTEM
········ : ELECTRIC SYSTEM

— : COMPRESSED AIR SYSTEM
– – – : LUBRICANT SYSTEM
——— : CONTROL SYSTEM
······· : ELECTRIC SYSTEM

——— : COMPRESSED AIR SYSTEM
— — — : LUBRICANT SYSTEM
--------- : CONTROL SYSTEM
·········· : ELECTRIC SYSTEM

—— : COMPRESSED AIR SYSTEM
- - - : LUBRICANT SYSTEM
----- : CONTROL SYSTEM
-·-·- : ELECTRIC SYSTEM

GAS COMPRESSOR WITH A PLURALITY OF AIR REALEASE SYSTEMS EACH HAVING AN AIR RELEASE VALVE AND AN AIR REGULATING VALVE

TECHNICAL FIELD

The present invention relates to a gas compressor, and relates to a gas compressor that performs unload operation control.

BACKGROUND ART

A gas compressor is known in which liquid such as oil or water is supplied into a compression chamber for compressing suction gas to generate compressed gas. In the following, an air compressor of the oil supply type in which the gas to be compressed is air and the liquid to be supplied is oil is described as an example.

Capacity control for an air compressor can be roughly divided into two control types. One of the control types is pressure fluctuation capacity control in which a consumption air amount is detected from a pressure fluctuation amount of the discharge line pressure to reduce the power consumption at the time of partial load. The other control type is constant pressure capacity control that keeps the discharge line pressure constant and controls the compressor rotation speed in response to increase/decrease in the consumption air amount.

Here, the pressure fluctuation capacity control is used in an air compressor in which an inverter is not incorporated, and the rotation speed of the compressor main body is constant (hereinafter, referred to sometimes as "constant speed machine"). The capacity control for a constant speed machine includes suction throttle control of adjusting the opening of a suction throttle valve disposed on the suction side of the compressor main body and air release control of opening and closing an air release valve disposed on the discharge side of the compressor main body. What uses one or both of the control types is known.

The constant pressure capacity control is used in a compressor in which an inverter is incorporated in order to increase or decrease the rotation speed of the compressor main body (hereinafter, referred to sometimes as "variable speed machine"). The variable speed machine is controlled so as to perform variable speed operation in which it is operated by high rotation by the inverter until a pressure set as a target is reached, and if the set pressure is exceeded, then the rotation speed is reduced by the inverter. For example, if the compressed air usage amount on the user side is great and the user side discharge pressure is lower than the target pressure, then the compressor is operated with a rated maximum rotation speed, but if the user side usage decreases soon and the user side discharge pressure becomes higher than the target pressure, then the rotation speed is decreased to perform energy saving. As the control for changing the rotation speed, P, PI, or PID (Proportional, Integral, Differential) control methods that change the rotation speed in proportion to the discharge pressure are generally known. Further, as a technique for achieving reduction of the power consumption, an operation method that uses one or both of suction throttle valve control and air release control in addition to such rotation speed control by an inverter as described above is known.

For example, according to Document 1 (JP-2001-342982-A), such control is performed that, although PID control operation is performed on the basis of a target pressure (P0), as the air usage amount on the user side decreases and the user side discharge pressure increases toward P0, the rotation speed is decreased so as to keep P0. Patent Document 1 discloses such an operation method that, if the user side discharge pressure further increases from the rotation speed with which P0 is kept to an upper limit pressure (P1) that is higher than P0, compressed air on the upstream side with respect to the user side discharge port is discharged to the atmospheric air in a state in which the rotation speed is a lower limit rotation speed or like means is taken to decrease the load on the compressor main body (load on the electric motor) to further decrease the power.

In this manner, in both the constant speed machine and the variable speed machine, if the air release amount of compressed air in an oil separation tank is increased, then since the pressure in the inside of the oil separation tank decreases, the load to act upon the compressor main body can be decreased.

PRIOR ART DOCUMENT

Patent Document

Patent Document 1: JP-2001-342982-A

SUMMARY OF THE INVENTION

Problem to be Solved by the Invention

Incidentally, in most oil supply type air compressors, the pressure in the inside of the oil separation tank is utilized as supply pressure for lubricant. In oil supply type compressors, actions of oil supplied into the compression working chamber include a cooling action on compressed gas, a sealing action of preventing compression leak in the inside of the compression mechanism, a lubricating action of reducing the internal friction in the compression mechanism and so forth. For example, if the compression mechanism is of the screw type, then the lubricant performs cooling of compressed air and sealing and lubrication between rotors or between the rotors and bore faces of a compressor main body casing. Further, during execution of the suction throttle valve control or the air release control, in order to lubricate between the rotors or between the rotors and the bore faces, a constant amount or more lubricant is necessary to be supplied to the compression working chamber. Therefore, also during the suction throttle valve control or the air release control, from the necessity to continue to supply sufficient oil, it is necessary to secure a predetermined pressure or more for the internal pressure of the oil separation tank. However, if the air release amount is great, then there is the possibility that the predetermined pressure may not be secured.

In this regard, it is possible to secure, by disposing an orifice or the like that opens or closes in response to a specific pressure on the air release route, a constant pressure or more as the pressure (control pressure) in the inside of the oil separation tank also during the air release control. However, since such pressure in the inside of the oil separation tank differs among different compressors, there is a problem that an orifice conforming to the specifications of any of them must be prepared suitably.

Further, as another method for securing the pressure in the inside of the oil separation tank, also it is possible to increase the rotation speed of the electric motor during the air release control. However, this makes a factor also of power increase.

Meanwhile, generally, an oil supply type air compressor of the inverter control type, in most cases, executes variable speed control. However, also it is possible to be constant the output frequency from the inverter such that the compressor is used in a similar manner to the constant speed machine. In particular, also it is possible for an oil supply type compressor in which an inverter is incorporated to perform both operation of the variable speed control by P, PI or PID and operation of constant speed control by which the rotation speed of the electric motor is constant. In such a case as just described, between the variable speed control and the constant speed control, the oil separation tank internal pressure, namely, the control pressure, in the unloading control, sometimes is not equal to each other, and in one of such cases as described above, also there is the possibility that oil to be supplied to the compressor main body may become insufficient.

In a gas compressor, technologies that make the control pressure variable and can secure an appropriate control pressure upon unload control are demanded.

Means for Solving the Problem

In order to solve the problem described above, for example, a configuration described in the claim is applied. In particular, a gas compressor that includes a compressor main body that compresses gas and discharges the compressed gas, an electric motor that supplies driving force to the compressor main body, a power conversion device that supplies predetermined frequency power to the electric motor, at least one of a suction throttle valve disposed on a suction side of the compression main body and an air release valve that releases the compressed gas in a discharge piping system to an atmospheric pressure environment, and a controller, the gas compressor performing unload operation of reducing, when a discharge pressure reaches a predetermined pressure, a load on the compressor main body by closing the suction throttle valve or opening the air release valve, includes a current value detector that detects a current value inputted to the power conversion device and outputs the current value to the controller. Further, the controller, when the current value becomes equal to a predetermined lower limit current value during the unload operation, opens the suction throttle valve or closes the air release valve, and the controller, when the current value becomes equal to a predetermined upper limit current value that is higher than the lower limit current value, closes the suction throttle valve or opens the air release valve.

According to another configuration, a gas compressor that includes a compressor main body that compresses gas and discharges the compressed gas, an electric motor that supplies driving force to the compressor main body, a power conversion device that supplies predetermined frequency power to the electric motor, at least one of a suction throttle valve disposed on a suction side of the compression main body and an air release valve that releases the compressed gas in a discharge piping system to an atmospheric pressure environment, and a controller, the gas compressor performing unload operation of reducing, when a discharge pressure reaches a predetermined pressure, a load on the compressor main body by closing the suction throttle valve or opening the air release valve, includes a pressure sensor that detects a pressure value of gas discharged by the compressor main body and outputs the pressure value to the controller. Further, the controller, when the pressure value becomes equal to a predetermined lower limit pressure value during the unload operation, opens the suction throttle valve or closes the air release valve, and the controller, when the pressure value becomes equal to a predetermined upper limit pressure value that is higher than the lower limit pressure value, closes the suction throttle valve or opens the air release valve.

According to a further configuration, a gas compressor that includes a compressor main body that compresses gas and discharges the compressed gas, an electric motor that supplies driving force to the compressor main body, a power conversion device that supplies predetermined frequency power to the electric motor, an air release valve disposed in an air release system communicating with a discharge piping system to discharge the compressed gas to an atmospheric pressure environment, and a controller, the gas compressor performing unload operation of reducing, when a discharge pressure reaches a predetermined pressure, a load on the compressor main body by opening the air release valve, includes a plurality of the air release systems for each of which the air release value is disposed, and a plurality of pressure regulating valves provided on a downstream side of the air release valves and having opening and closing pressures that are different from each other. Further, the controller selects one of the air release valves and performs the unload operation.

Advantages of the Invention

According to one aspect of the present invention, the control pressure can be made variable and an appropriate control pressure can be secured. Other problems, configurations, and advantages of the present invention become apparent from the following description.

MODES FOR CARRYING OUT THE INVENTION

In the following, modes for carrying out the invention are described with reference to the drawings.

Figure 1:
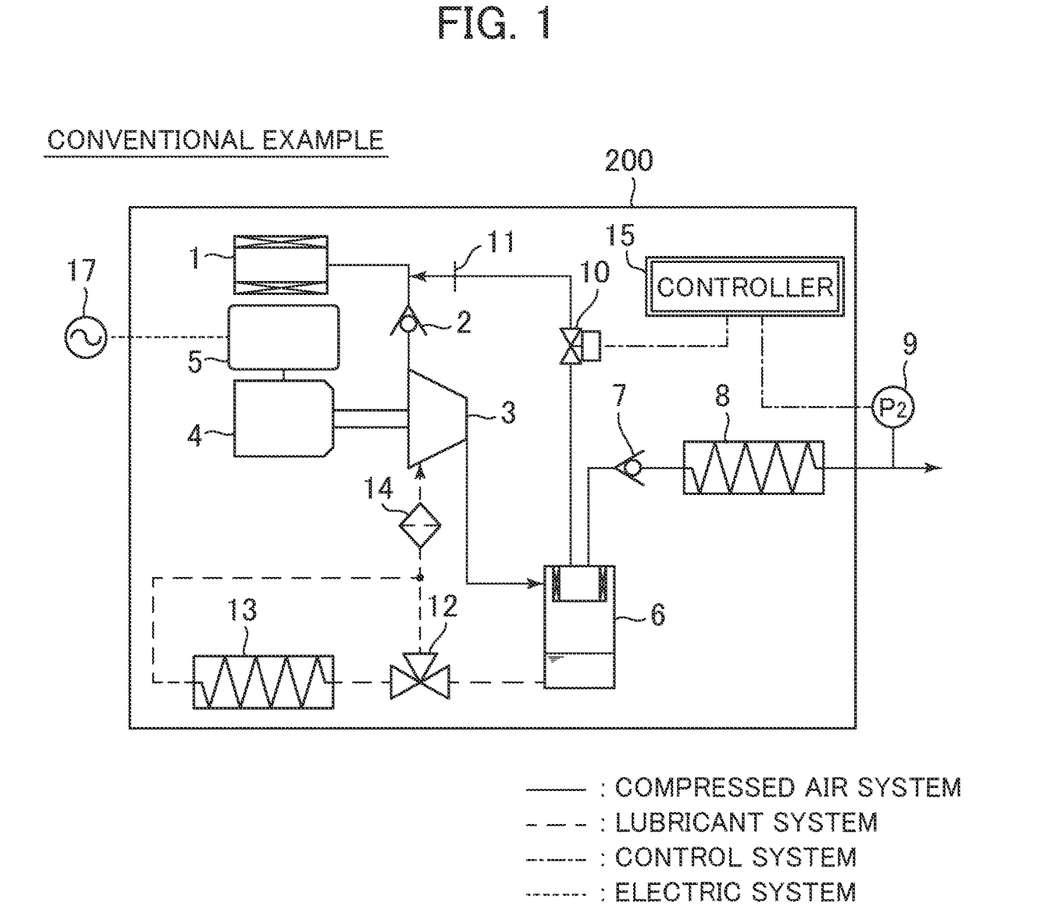
FIG. 1 is a schematic view depicting a configuration of an oil supply type air compressor of a conventional example.

First, a conventional example is described, and then an embodiment of the present invention is described. FIG. 1 schematically depicts a configuration of a conventional oil supply type air compressor. In the oil supply type air compressor 200 (hereinafter referred to sometimes as "compressor 200"), if a compressor main body 3 is driven by an electric motor 4 to which electric power is supplied from an inverter 5 (power conversion device), then the atmospheric air is sucked into the compressor main body through a suction throttle valve 2. The atmospheric air sucked in is boosted by a compression action of the compressor main body 3, and compressed air of a predetermined pressure is discharged from a discharge port of the compressor main body 3. Here, to a compression chamber of the compressor main body 3, lubricant for cooling of the compressed sucked air, sealing for air leak prevention and lubrication between members is supplied, and from the compressor main body 3, the compressed air in the form of gas-liquid mixture is discharged.

The compressed air from the compressor main body 3 flows into an oil separation tank 6 (liquid separation tank), and the compressed air and the lubricant are separated from each other. The compressed air separated by the oil separation tank 6 is cooled by an after cooler 8 and is then sent into user-used equipment.

On the other hand, the lubricant separated by the oil separation tank 6 is supplied, when the oil temperature thereof is lower than a threshold value of a temperature regulating valve 12, from the temperature regulating valve 12 to the compressor main body 3 through an oil filter 14. When the oil temperature is higher than the threshold value, the lubricant flows from the temperature regulating valve 12 to an oil cooler 13 side, by which it is cooled such that the temperature thereof becomes a temperature within a predetermined temperature range, whereafter the lubricant is supplied to the compressor main body 3 through the oil filter 14. The pressure that recirculates the oil separated by the oil separation tank 6 again to the compressor main body is the discharge air pressure of the compressor main body 3. In other words, the lubricant is pumped by the internal pressure of the oil separation tank 6.

In the downstream of the air system of the oil separation tank 6, a branch pipe that branches to the suction side of the compressor main body 3 is disposed, and an air release valve 10 is provided on the pipeline. The air release valve 10 is a valve body that is opened and closed in response to a command from a controller 15. When the air release valve 10 is open, the air in the inside of the oil separation tank 6 (air on the upstream side with respect to a check valve 7) is released to the suction side of the compressor main body 3. By this, the load on the electric motor is reduced and energy saving is implemented.

On a downstream side pipe of the after cooler 8, a pressure sensor 9 is disposed. The pressure sensor 9 detects the discharge air pressure of the compressor 200 and outputs a result of the detection to the controller 15. The controller 15 monitors the discharge air pressure value and outputs a frequency command value to the inverter 5 or performs overall control for opening or closing of the air release valve 10 and so forth.

It is to be noted that, although FIG. 1 depicts a variable speed machine in which the inverter 5 is incorporated, the configuration of a constant speed machine is substantially similar to that of the variable speed machine except that it does not include the inverter 5 in FIG. 1 and that the controller performs power supply for constant speed rotation to the electric motor 4.

Now, transition of "unload control" by constant speed control and variable speed control of the conventional example is described.

Figure 2:
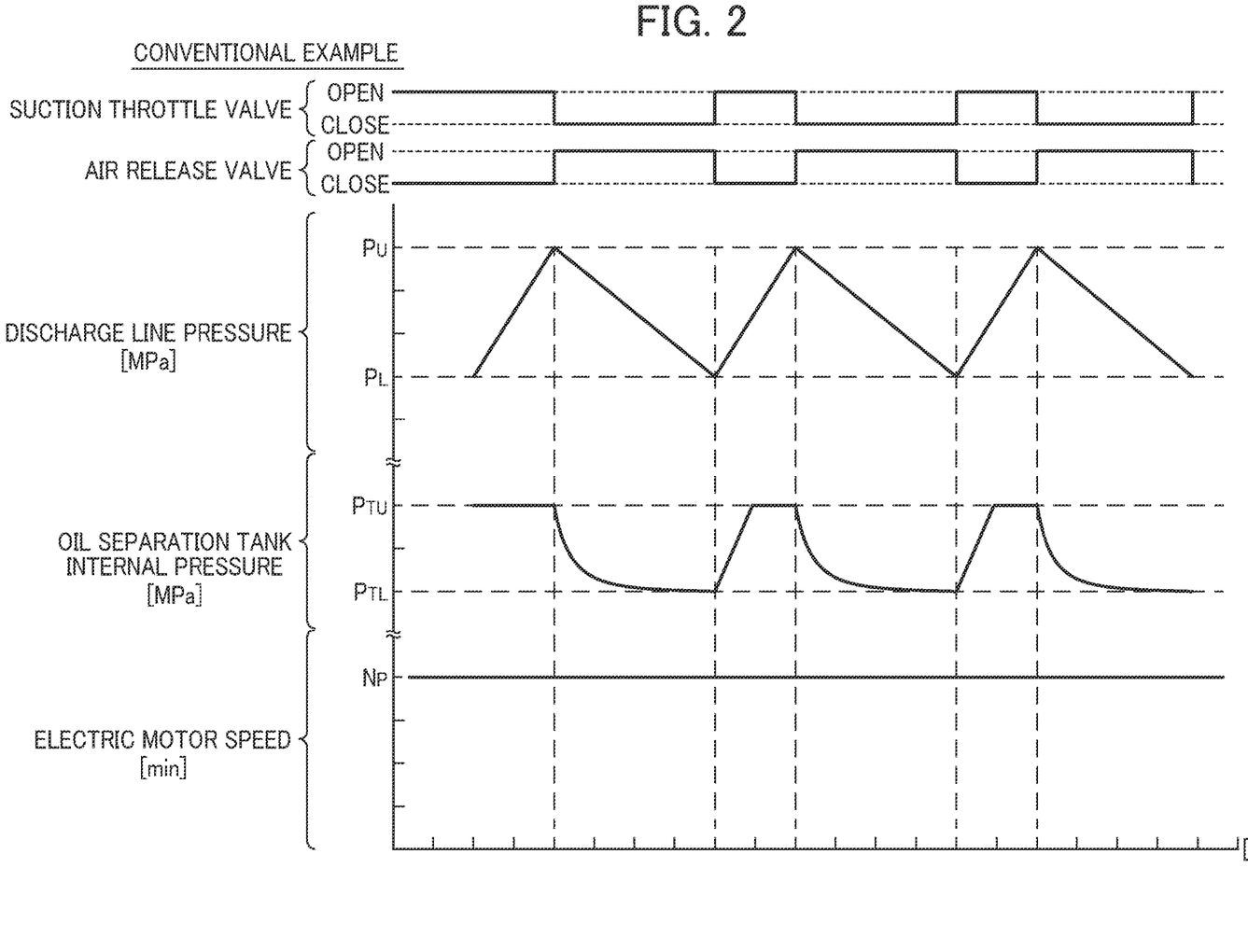
FIG. 2 is a view depicting transition of load-unload control by constant speed control of the conventional example.

FIG. 2 depicts a time series variation by "unload control" at the constant speed control. If the discharge line pressure reaches PU (upper limit pressure), then the controller 15 closes the suction throttle valve 2 and opens the air release valve 10 such that the pressure in the oil separation tank 6 is released through the air release valve 10 to start air release valve control. Although the pressure in the oil separation tank 6 continues to be released until after the discharge line pressure decreases to PL (lower limit pressure), by closing an orifice (pressure regulating valve) 11, the pressure in the oil separation tank 6 is stabilized at an oil separation tank internal pressure PTL (unload stable pressure).

If the discharge line pressure decreases to a pressure PL (lower limit pressure/load return pressure), then the controller 15 opens the suction throttle valve 2 and closes the air release valve 10. Consequently, the pressure in the oil separation tank 6 increases and the discharge line pressure increases. It is to be noted that the rotation speed of the electric motor 4 is NF and is always constant.

Figure 3:
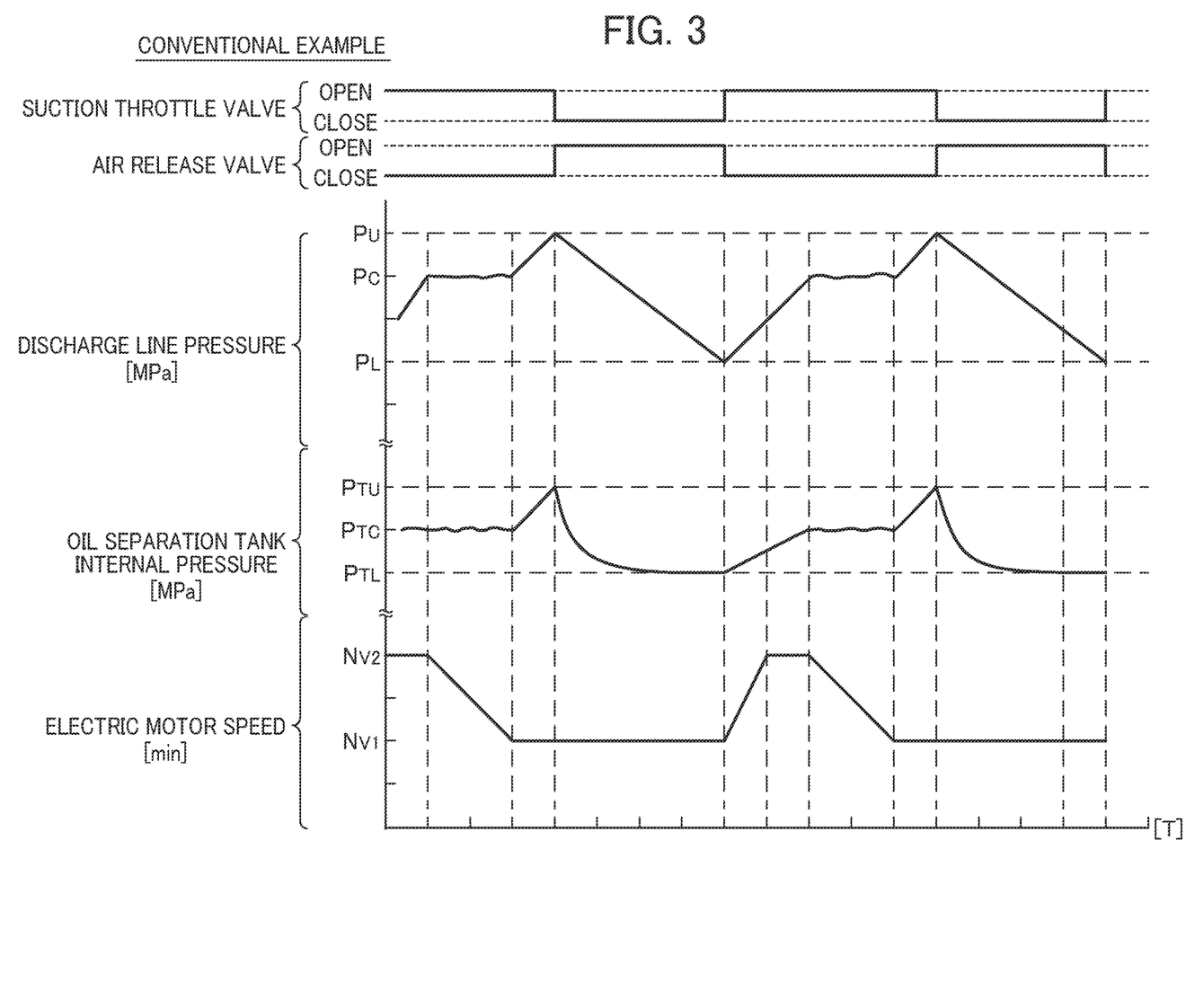
FIG. 3 is a view depicting transition of load-unload control by variable speed control of the conventional example.

FIG. 3 depicts a time series variation by "unload control" by the variable speed control (here, PID control) of the conventional example.

If the discharge line pressure reaches a pressure PC (target pressure), then the output frequency of the inverter 5 is changed by P, PI, or PID to increase or decrease the rotation speed of the electric motor 4 (in FIG. 3, depicted as during deceleration) such that the discharge line pressure is stabilized at the pressure PC. Even if the rotation speed of the electric motor 4 decreases to a lower limit rotation speed NV1, if the consumption amount of compressed air decreases, then the discharge line pressure gradually increases and soon reaches the pressure PU. After the pressure PU is reached, the internal pressure of the oil separation tank 6 is released through the air release valve 10 so as to be decreased similarly to the case of the constant speed control.

As depicted in FIGS. 2 and 3, in the constant speed control and the variable speed control, although the rotation speed of the electric motor differs, an action of releasing the internal pressure of the oil separation tank 6 after the "unload control" is started is the same.

Working Example 1

Taking the conventional example described above into consideration, a working example 1 of the present invention is described.

Figure 4:
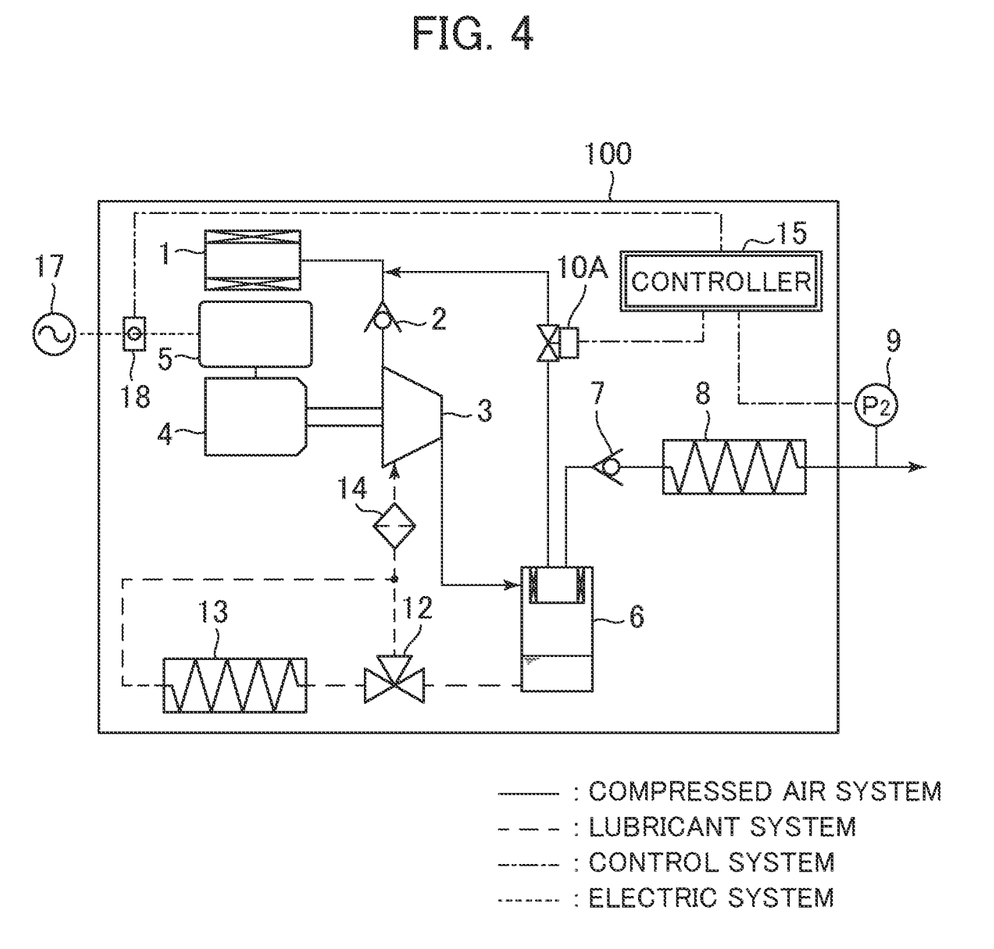
FIG. 4 is a schematic view depicting a configuration of an oil supply type air compressor according to a working example 1 of the present invention.

FIG. 4 depicts a configuration of an oil supply type air compressor 100 (hereinafter referred to sometimes as "compressor 100") according to the working example 1 to which the present invention is applied. It is to be noted that, although the present working example is described assuming that the compressed gas is air and the liquid to be supplied into the compression chamber is oil, the present invention is not restricted to this, and the compressed medium may be some other gas and also the liquid to be supplied to the compression chamber may be some other liquid such as water.

The compressor 100 includes a compressor main body 3, an electric motor 4, an inverter 5, an oil separation tank 6, an after cooler 8, an oil cooler 13 and a controller 15 and is a package type compressor in which they are accommodated in a housing.

The compressor main body 3 is a displacement type screw compressor main body that generates compressed air by meshing engagement of male and female screw rotors that rotate relative to each other. It is to be noted that, according to the present invention, also it is possible to apply the other displacement type compressor or a rotary type compressor.

Further, the compressor main body 3 may be of the single screw rotor type or of a type in which three or more screw rotors are used, or may be a multi-stage compressor main body that includes a plurality of compressor main bodies.

The inverter 5 receives supply of electric power from a power supply 17, converts the electric power into electric power of a predetermined frequency in response to a frequency command value from the controller 15, and supplies the resulting electric power to the electric motor 4. To the electric motor 4, electric motors of various types can be applied. The output power shaft side of the electric motor 4 is connected to the screw rotor of the compressor main body 3 directly or indirectly through a gear, a belt, or the like, and supplies driving force to the compressor main body 3.

The oil separation tank 6 is a separator that separates oil and water from compressed air, which has been discharged from the compressor main body 3 and is gas-liquid mixture (oil and air), by impingement separation, swirling separation, or both of them. The separated compressed air flows into a discharge piping system and is supplied to the use side (user side) of the compressed air through a check valve 7, which permits the compressed air to flow from the oil separation tank 6 to the downstream side, and the after cooler 8 of the air-cooled type or the liquid-cooled type.

The controller 15 configures various functioning sections by cooperation of a computation device and a program and performs control of the entire compressor 100. The controller 15 may be configured partly or entirely from an analog control circuit. The compressor 100 includes an oil piping system that returns the oil separated by the oil separation tank 6 to the compressor main body 3. The oil separated from the air by the oil separation tank 6 is returned to the compressor main body 3 by internal pressure of the oil separation tank 6. The oil piping system includes a temperature regulating valve 12, an oil cooler 13 and an oil filter 14. The temperature regulating valve 12 is a three-way solenoid valve having a temperature detection function and switches the line to which the oil is to be flown by opening, where the temperature of the oil flowing from the oil separation tank 6 is equal to or higher than a predetermined temperature, the exit of the three-way solenoid valve to the oil cooler 13 side, and opening, when the temperature of the oil is lower than the predetermined temperature, the exit of the three-way solenoid valve on the side that bypasses the oil cooler 13, such that the oil temperature is managed so as to remain within a predetermined temperature range.

The compressor 100 further includes a suction throttle valve 2 on the suction side of the compressor main body 3. The suction throttle valve 2 is a mechanical or electromagnetic valve body that adjusts the air amount to be flown in from the suction path of the compressor main body 3. For example, in "unload control" hereinafter described, the suction throttle valve 2 is controlled so as to be closed or have a small opening. In a case where the suction throttle valve 2 is of the mechanical type, the internal pressure of the oil separation tank 6 (on the upstream side of the check valve 7) is utilized as control pressure. In other words, opening/closing control of the valve body is performed with the internal pressure through a control pipe (not depicted).

The compressor 100 further includes a pressure sensor 9 in the discharge piping system on the downstream side of the oil separation tank 6. The pressure sensor 9 is disposed on the downstream side of the check valve 7 to detect the pressure of compressed air and outputs a result of the detection to the controller 15. The controller 15 compares the input pressure from the pressure sensor 9 and a set pressure (selected by the user or retained as an initial value) with each other to determine a frequency command to be outputted to the inverter 5. The present working example is described assuming that the compressor main body 3 is driven by PID control.

The compressor 100 further includes an air release piping system on the downstream side of the oil separation tank 6 and includes an air release valve 10A on the air release piping system. While the air release piping system is communicated with the discharge piping system in terms of flow and pressure of air, the flow of compressed air to the outside is controlled by opening/closing of the air release valve 10A. The air release valve 10A is disposed on the air release pipe disposed on the downstream side of the oil separation tank 6 and on the upstream side with respect to the check valve 7. The air release piping system is a pipe that connects the discharge piping side of the oil separation tank 6 and the suction side of the compressor main body (more particularly, the downstream side of a suction filter 1) to each other. The air release valve 10A is opened or closed in response to a command from the controller 15, in "unload control" hereinafter described, to release the compressed air on the upstream side with respect to the check valve 7 to the atmospheric air (to the primary side of the suction throttle valve 2).

The compressor 100 further includes a current value detector 18 that detects a current value between the power supply 17 and the inverter 5. The current value detector 18, in "unload control" described later, detects the current value when the control pressure of the compressor main body is managed and outputs the current value to the controller 15. Further, the controller 15 stores in advance correlation information indicative of a relation between the current value and the pressure. The correlation information is information on a current value corresponding to load applied to the compressor main body 3. The controller 15 can decide the internal pressure of the oil separation tank 6 (pressure on the upstream side of the check valve 7) from an input of a current value such that, for example, when the load (pressure) applied to the compressor main body 3 is 0.3 MPh, the current value is IL2, and when the pressure is 0.25 MPh, the current value is IL1 that is lower than IL2.

The "unload control" of the compressor 100 having such a configuration as described above is described. In the present working example, the "unload control" is a control method of reducing the power consumption by reducing, when the detection pressure of the pressure sensor 9 reaches the upper limit pressure PU higher than the target pressure PC by decrease in the consumption amount of compressed air, the load on the compressor main body 3 by closing the suction throttle valve 2 (suction throttle control) and opening the air release valve 10A (air release control). It is to be noted that, at the "unload control," the rotation speed of the electric motor 4 indicates a state of the lowest rotation speed.

Further, it is one of features of the present working example that, at the "unload control," the fluctuation situation of the load related to the compressor main body 3 is managed from the current value detected by the current value detector 18. In particular, if the load on the compressor main body 3 increases, then the input current amount increases, but if the load decreases, then the input current amount decreases. In the present working example, by monitoring the current value, the control pressure of the compressor 100 is managed in "unload control."

Figure 5:
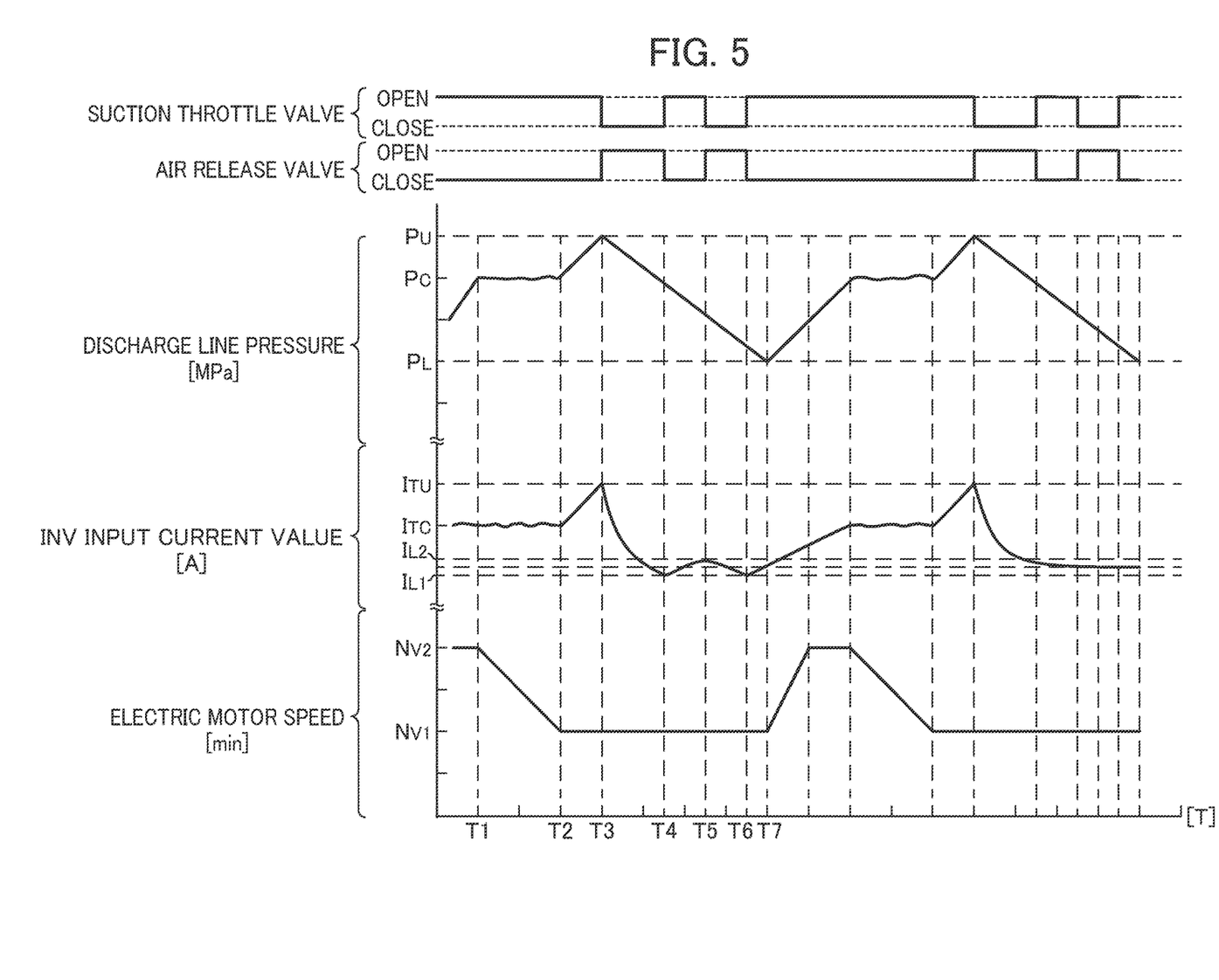
FIG. 5 is a view depicting transition of load-unload control by the working example 1.

FIG. 5 depicts a time series variation in the "unload control" by the working example 1. In FIG. 5, the uppermost stage indicates opening/closing of the suction throttle valve 2 and opening/closing transition of the air release valve 10A;

the second stage indicates transition of the discharge line pressure detected by the pressure sensor 9; the third stage indicates transition of the INV (inverter) input current detected by the current value detector 18; and the fourth stage indicates the rotation speed of the electric motor 4 (equivalent to the output frequency of the inverter 5). Further, in the discharge line pressure in the second stage, the pressure PC indicates the target pressure (set pressure); the pressure PU indicates the upper limit pressure at which "unload control" is started; and the pressure PL indicates a lower limit pressure with which returning from the "unload control" to the "load control" is performed.

After the compressor is started, the controller 15 outputs a command to the inverter 5 to cause the electric motor 4 to operate by rated full speed rotation on the basis of a predetermined acceleration rate. Consequently, the discharge pressure of the compressor main body 3 starts increase toward the target pressure PC. At this time, the suction throttle valve 2 is open; the air release valve 10A is closed; and the INV input current value is ITC.

When the discharge line pressure reaches PC at time T1, the controller 15 outputs a frequency command value to the inverter 5 such that the pressure PC is maintained by PID control on the basis of an output value of the pressure sensor 9. Consequently, the discharge line pressure is maintained on the basis of the pressure PC.

During a period from time T1 to T2, the consumption amount of compressed air gradually decreases, and therefore, the frequency outputted from the inverter 5 decreases and the rotation speed of the electric motor 4 decreases, for example, to NV1 that is the lowest rotation speed.

At time T2, when the rotation speed of the electric motor 4 is the lower limit rotation speed NV1 that is the lowest limit rotation speed, if the consumption amount of compressed air decreases, then the discharge line pressure starts increase. By the increase in the load, the inverter input current amount increases up to ITU.

When the discharge line pressure reaches the upper limit pressure PU at time T3, the controller 15 starts "unload" operation. In particular, the suction throttle valve 2 is closed to limit the suction air amount and the air release valve 10A is opened to release compressed air of the oil separation tank 6 (on the downstream side with respect to the check valve 7) to the atmospheric air environment. Consequently, the internal pressure of the oil separation tank 6 decreases rapidly and the load on the compressor main body 3 is reduced, and decrease in the power consumption can be achieved.

Here, the pressure by the compressed air discharged from the compressor main body 3 in such a manner as described hereinabove functions as a control pressure for the compressor 100 (power for returning the separated oil to the compressor main body 3, opening/closing power for the suction throttle valve 2 and so forth). Therefore, in order to secure a predetermined control pressure, in the present working example, limitation of the suction amount and release of the compressed air are managed depending upon whether or not the current value detected by the current value detector 18 is lower than a predetermined threshold value.

In particular, when the INV input current value decreases to a current threshold value IL1 at time T4, the controller 15 opens the suction throttle valve 2 and closes the air release valve 10A to increase the internal pressure of the oil separation tank thereby to keep the control pressure.

Thereafter, when the oil separation tank internal pressure increases and the INV input current value increases to IL2 that is higher than the current threshold value IL1, the controller 15 closes the suction throttle valve 2 and opens the air release valve 10A at time T5 to decrease the oil separation tank internal pressure again. Then, when the INV input current value decreases to IL1 again at time T6, the controller 15 opens the suction throttle valve 2 and closes the air release valve 10A again to increase the oil separation tank internal pressure. In short, the compressor 100 secures the control pressure in the "unload control" by monitoring the INV input current value.

Thereafter, when the discharge line pressure decreases to the lower limit pressure PL at time T7, the controller 15 switches its control from the "unload control" to the "load control." In particular, the controller 15 places the suction throttle valve 2 into an open state and places the air release valve 10A into a closed state (in a case where the INV input current value decreases to IL1 when they already are in the states mentioned, the current states are maintained), and outputs a frequency command value in rated full speed operation to the inverter 5. Consequently, the discharge line pressure starts to increase toward the target pressure PC.

In this manner, according to the present working example, in the "unload control," the oil separation tank internal pressure can be managed such that the control pressure is secured.

Further, by changing the upper limit current value IL2 and the lower current value IL1 of the INV input current value, it is possible to set an optional control pressure easily in response to various specifications and usage manners of the compressor 100, and it is possible to secure the control pressure with certainty.

It is to be noted that, although, in the present working example, a compressor to which the variable speed control by PID is applied is taken as an example, the present invention can be applied also to a compressor to which the constant speed control is applied using the inverter 5. This is described using the constant speed control by the conventional example of FIG. 2. In a case where the INV input current value becomes a lower limit current value (IL1) corresponding to a predetermined control pressure during execution of the "unload operation (the rotation speed of the electric motor is constant)" by closing, when the discharge line pressure becomes the upper limit pressure PU, the suction throttle valve 2 and opening the air release valve 10, the suction throttle valve 2 is opened and the air release valve 10A is opened. Thereafter, when it is detected that the INV input current value is equal to IL2, the suction throttle valve 2 is controlled to a closed state and the air release valve 10A is controlled to an open state. Consequently, even with the constant speed control, a desired control pressure can be secured.

Further, although, in the present working example, both the suction throttle valve 2 and the air release valve 10A are operated (opened/closed), the advantage of the present invention can be obtained even by opening and closing only one of the suction throttle valve 2 and the air release valve 10A.

Further, while it is described in the description of the working example that, in both cases in which the compressor 100 selectively uses the constant speed control and the variable speed control, the upper limit current value and the lower limit current value of the INV input current are similar, also it is possible to set the upper limit current value and the lower limit value to different values between the constant speed control and the variable speed control. For example, a plurality of pieces of information indicative of different correlations between the pressure and the INV input current may be provided in the controller 15 such that one of the plurality of pieces of correlation information is selected at each of the constant speed control and the variable speed control.

Working Example 2

Now, a working example 2 of the present invention is described. Although, in the working example 1, a desired control pressure is secured in the "unload control" on the basis of a current value detected by the current value detector 18, it is one of features of the working example 2 that the control pressure in the "unload control" is secured using a detection pressure of a pressure sensor that detects the internal pressure of the oil separation tank 6 (on the upstream side of the check valve 7).

Figure 6:
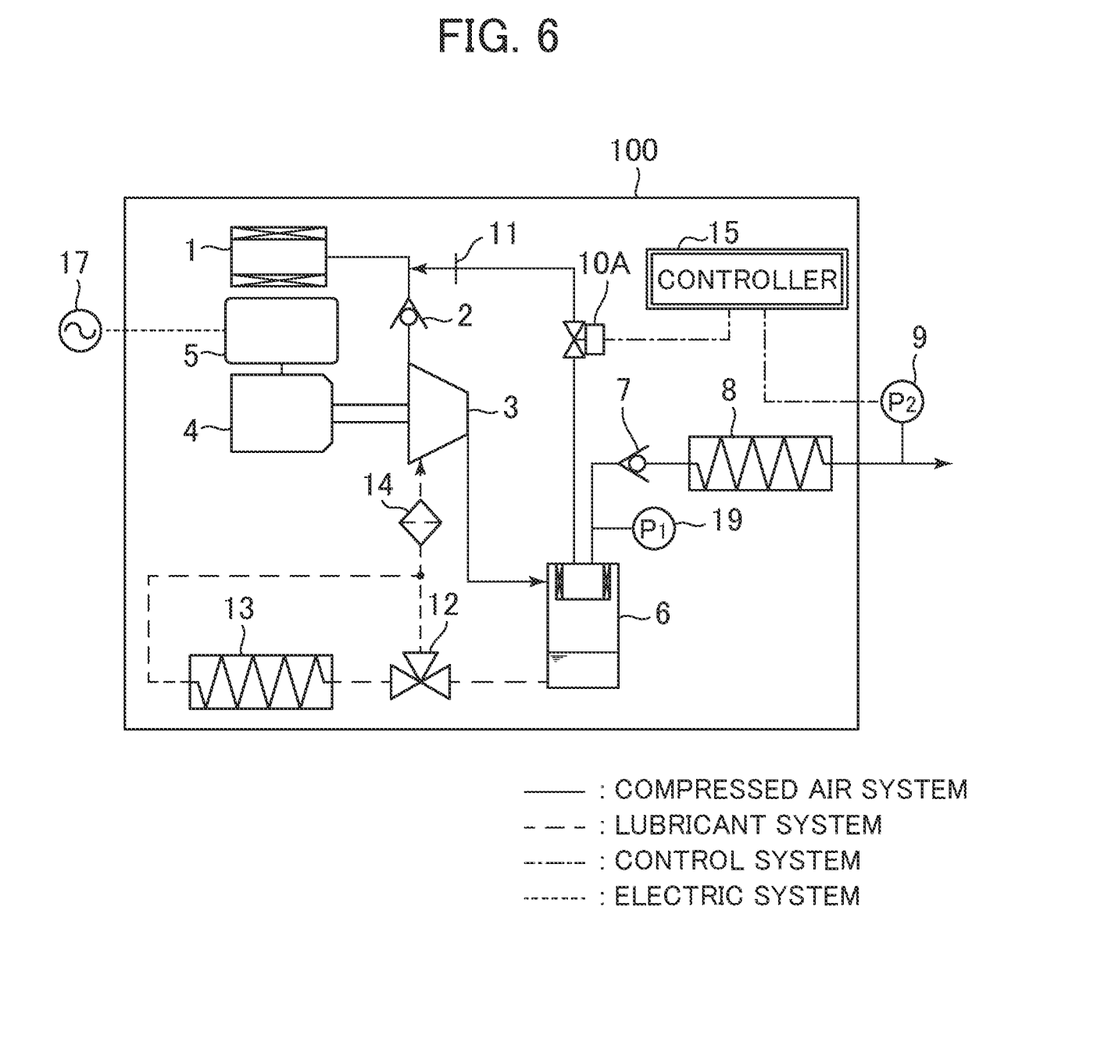
FIG. 6 is a schematic view depicting a configuration of an oil supply type air compressor according to a working example 2 of the present invention.

FIG. 6 depicts a configuration of a compressor 100 according to the working example 2. It is to be noted that the same elements as those of the working example 1 are denoted by the same reference characters and detailed description of them is sometimes omitted.

The compressor 100 includes a pressure sensor 19 at a position on the upstream side of the check valve 7 on the discharge piping system of the oil separation tank 6. It is to be noted that the position of the pressure sensor 19 is not limited to this, and the present invention can be carried out at whichever position on the discharge side of the compressor main body 3 on the upstream side of the check valve 7 the pressure sensor 19 is located.

Further, the controller 15 stores a lower limit pressure PTL1 and an upper limit pressure PTL2 higher than the lower limit pressure PTL1 as pressure threshold values in the "unload control." PTL1 and PTL2 are pressures lower than the discharge line pressure PU, target pressure PC, and lower limit pressure PL.

Figure 7:
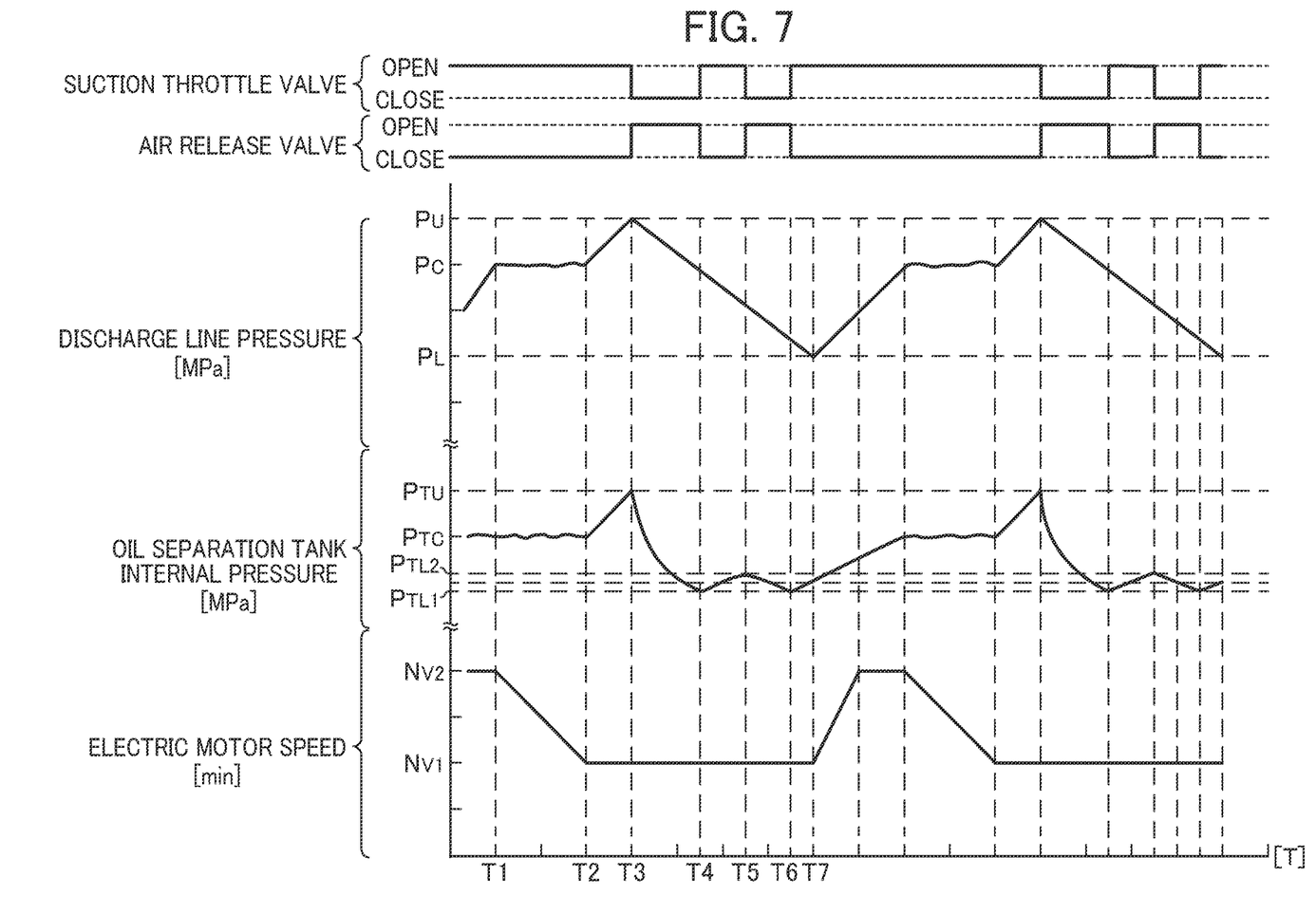
FIG. 7 is a view depicting transition of load-unload control by the working example 2.

FIG. 7 depicts a time series variation of the "unload control" by the working example 2. Similarly to the working example 1, when the discharge line pressure reaches the upper limit pressure PU at time T3, the controller 15 starts "unload" operation. The internal pressure of the oil separation tank 6 decreases rapidly, and the load on the compressor main body 3 is decreased.

When the oil separation tank internal pressure decreases to the lower limit pressure PTL1 at time T4, the controller 15 opens the suction throttle valve 2 and closes the air release valve 10A to increase the oil separation tank internal pressure and keep the control pressure.

Thereafter, when the oil separation tank internal pressure increases up to the upper limit pressure PTL2, the controller 15 closes the suction throttle valve 2 and opens the air release valve 10A at time T5 to decrease the oil separation tank internal pressure again. When the oil separation tank internal pressure decreases to PTL1 again at time T6, the controller 15 opens the suction throttle valve 2 and closes the air release valve 10A again to increase the oil separation tank internal pressure. In other words, the compressor 100 secures the control pressure in the "unload control" by monitoring the oil separation tank internal pressure.

In this manner, according to the present working example, the oil separation tank internal pressure can be managed such that the control pressure is secured in the "unload control."

Further, by changing the upper limit pressure PTL2 and the lower limit pressure PTL1 of the INV input current value, it is possible to set an optional control value easily for various specifications and usage manners of the compressor 100. Further, the control pressure can be secured with certainty.

It is to be noted that, while, in the present working example, a compressor to which the variable speed control is applied is taken as an example, the present invention can be applied also to a compressor to which the constant speed control is applied using the inverter 5, similarly to the working example 1. This is described using the constant speed control by the conventional example of FIG. 2. In a case where the oil separation tank internal pressure becomes the lower limit pressure PTL1 during execution of the "unload operation (the rotation speed of the electric motor is constant)" by closing the suction throttle valve 2 and opening the air release valve 10A when the discharge line pressure becomes the upper limit pressure PU, the suction throttle valve 2 is opened and the air release valve 10A is closed. Thereafter, when the oil separation internal pressure PTL2 is detected, the suction throttle valve 2 is controlled to a closed state and the air release valve 10A is controlled to an open state. Consequently, even with the constant speed control, a desired control pressure can be secured.

Further, also in the present working example, the advantage of the present invention can be obtained even by opening and closing only one of the suction throttle valve 2 and the air release valve 10A, similarly to the working example 1.

Further, also in the present working example, when the constant speed control and the variable speed control are used in a switching manner, the upper limit pressure and the lower limit pressure of the oil separation tank internal pressure may be made different between the constant speed control and the variable speed control such that one of them is selected.

Working Example 3

Now, a working example 3 of the present invention is described. Although, in the working examples 1 and 2, management of the control pressure during the "unload control" is performed by monitoring the output value of the current value detector 18 or the pressure sensor 19, the working example 3 is different from them in that two or more air release valves and air release piping systems having air release amounts different from each other are provided such that they can be selectively used.

Although described in connection with the working examples 1 and 2, control using an inverter can be performed as both the constant speed control and the various speed control (P, PI, PID). In the "unload control" in both of the above controls, the control pressures to be secured may not be the same as each other. Also there may be a case in which, even in the same constant speed control and the variable speed control, the control pressure is variable. Therefore, the working example 3 is one of features that keeping of different control pressures can be implemented.

In the following, the working example 3 is described with reference to the drawings. It is to be noted that the same elements as those of the working examples described above are denoted by the same reference characters and detailed description of them is sometimes omitted.

Figure 8:
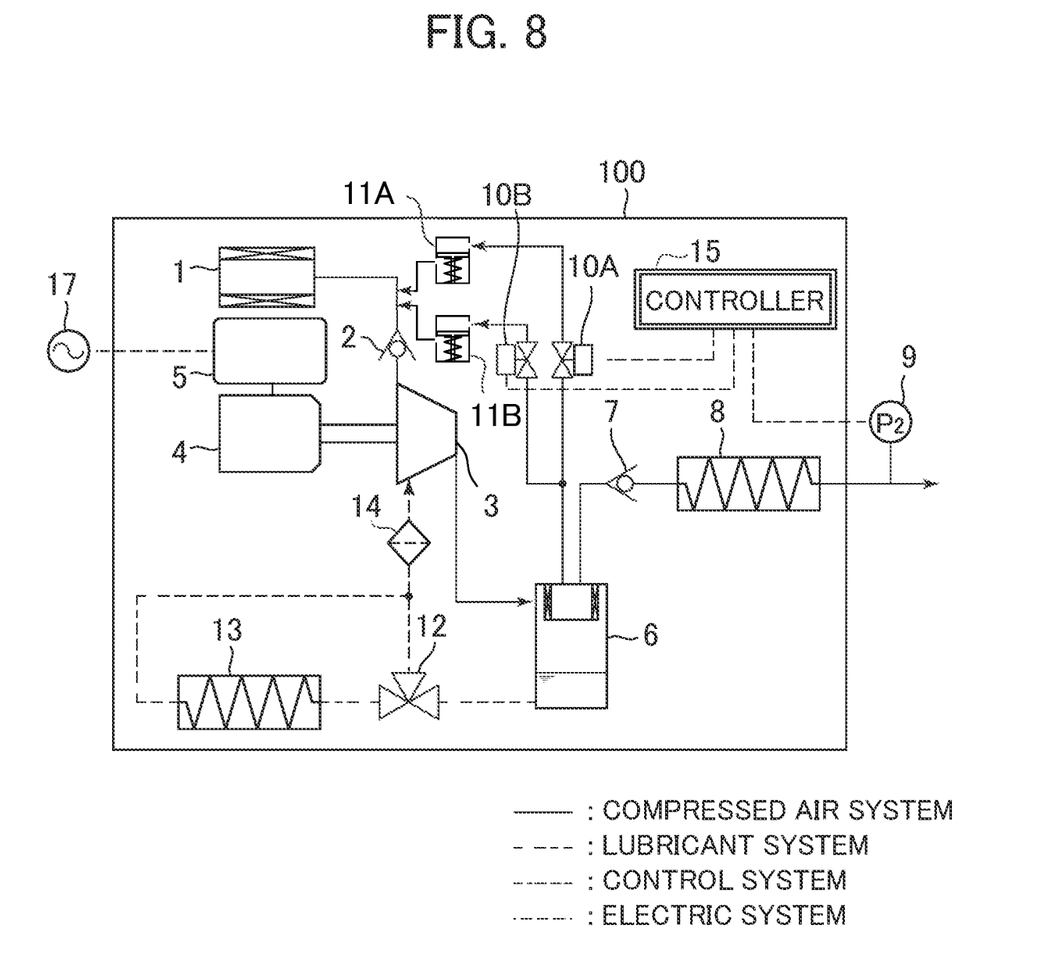
FIG. 8 is a schematic view depicting a configuration of an oil supply type air compressor according to a working example 3 of the present invention.

FIG. 8 depicts a configuration of a compressor 100 according to the working example 3. The compressor 100 includes two air release piping systems on the downstream side of the oil separation tank 6. Each of the two air release piping systems includes an air release valve 10A and an orifice (pressure regulating valve) 11A or an air release valve 10B and an orifice (pressure regulating valve) 11B.

The air release piping system that includes the air release valve 10A is an air release system for the variable speed control, and the air release piping system that includes the air release valve 10B is an air release system for the constant speed control. The controller 15 performs opening/closing only of the air release valve 10A in the "unload control" at the variable speed control, and performs opening/closing only of the air release valve 10B in the "unload control" at the constant speed control.

Each of the orifices 11A and 11B is a mechanical on-off valve that utilizes a spring or the like and is a valve body that is open with a predetermined pressure or more and is closed with a pressure less than the predetermined pressure. In the present example, the orifice 11A and the orifice 11B are different in pressure with which they are open (and closed) (for example, the pressures with which the orifice 11A is opened/closed are higher than those of the orifice 11B.) For example, in the case of the variable speed control, where the orifice 11A is closed in the "unload control," a desired control pressure can be kept.

Although the working examples for carrying out the present invention have been described, the present invention is not limited to the various examples described above, and various alterations, replacements of other working examples, and so forth are possible without departing from the spirit and the scope of the present invention.

For example, although the examples described above are configured so as to include the suction throttle valve 2 and the air release valves 10A and 10B, the present invention can be applied also to a compressor that includes only a suction throttle valve or an air release valve.

Further, although the compressor main body is that of the screw type as an example, the present invention can be applied also to the other displacement type compressors (of the rotary type, the reciprocating type, or the like) or centrifugal type compressors.

Further, in the variable speed control of the examples described above (FIGS. 5, 7 and so forth), the "unload control" is started when the discharge line pressure becomes equal to the upper limit pressure PU, and thereafter, when the discharge line pressure becomes equal to the lower limit pressure PL that is lower than the target pressure PC, the control is switched from the "unload control" to the "load control." However, the pressure of the lower limit pressure PL is optional and may be set to a value from equal to or higher than the target pressure PC to lower than the upper limit pressure PU.

DESCRIPTION OF REFERENCE CHARACTERS

1: Suction filter
2: Suction throttle valve
3: Compressor main body
4: Electric motor
5: Inverter
6: Oil separation tank
7: Check valve
8: After cooler
9: Pressure sensor
10A, 10B: Air release valve
11, 11A, 11B: Orifice
12: Temperature regulating valve
13: Oil cooler
14: Oil filter
15: Controller
17: Power supply
18: Current value detector
19: Pressure sensor
100, 200: Compressor (oil supply type air compressor)

The invention claimed is:

1. A gas compressor that includes a compressor main body that compresses gas and discharges the compressed gas, an electric motor that supplies driving force to the compressor main body, a power conversion device that supplies predetermined frequency power to the electric motor, a plurality of air release valves disposed in a plurality of air release systems communicating with a discharge piping system to discharge the compressed gas to an atmospheric pressure environment, and a controller, the gas compressor performing unload operation of reducing, when a discharge pressure reaches a predetermined pressure, a load on the compressor main body by opening one of the air release valves, the gas compressor comprising:

the plurality of air release systems each including at least one of the plurality of air release valves, and a plurality of pressure regulating valves provided on a downstream side of the at least one of the plurality of air release valves, respectively, and having an opening pressure and a closing pressure that are different between the plurality of pressure regulating valves, wherein the controller selects the at least one of the plurality of air release valves and performs the unload operation.

2. The gas compressor according to claim 1, wherein the controller allows the power conversion device to selectively perform both operation by a variable speed control command of any one of P (Proportional), PI (Proportional, Integral), and PID (Proportional, Integral, Differential) and operation by a constant speed control command in response to a pressure of the compressed gas discharged by the compressor main body, and the at least one of the plurality of air release valves to be controlled during the unload operation differs for operation of the variable speed control command and operation of the constant speed control command.

3. The gas compressor according to claim 1, wherein the gas compressor is a liquid supplied compressor and includes a liquid separation tank that separates compressed gas and liquid from a compressed gas-liquid mixture discharged by the compressor main body and returns the separated liquid to the compressor main body.

4. The gas compressor according to claim 1, wherein the compressor main body is a rotary, reciprocating or centrifugal compressor.

5. The gas compressor according to claim 1, wherein the gas is air.

* * * * *